US012700388B2

(12) United States Patent
Schieffer et al.

(10) Patent No.: US 12,700,388 B2
(45) Date of Patent: Aug. 4, 2026

(54) SYSTEM AND METHOD FOR SYNCING MUSIC

(71) Applicant: Heart Rate Inc., Santa Ana, CA (US)

(72) Inventors: Shane Schieffer, Superior, CO (US); Timothy Romanowski, Denver, CO (US)

(73) Assignee: Heart Rate Inc., Santa Ana, CA (US)

( * ) Notice: Subject to any disclaimer, the term of this patent is extended or adjusted under 35 U.S.C. 154(b) by 1127 days.

(21) Appl. No.: 17/482,170

(22) Filed: Sep. 22, 2021

(65) Prior Publication Data

US 2022/0093070 A1 Mar. 24, 2022

Related U.S. Application Data

(60) Provisional application No. 63/081,701, filed on Sep. 22, 2020.

(51) Int. Cl.
*G10H 1/36* (2006.01)
*G10H 1/00* (2006.01)

(52) U.S. Cl.
CPC .......... *G10H 1/368* (2013.01); *G10H 1/0008* (2013.01); *G10H 2240/325* (2013.01)

(58) Field of Classification Search
CPC . G10H 1/368; G10H 1/0008; G10H 2240/325
See application file for complete search history.

(56) References Cited

U.S. PATENT DOCUMENTS

2009/0047644 A1* 2/2009 Mensah .................. G09B 5/06 434/247
2011/0072147 A1 3/2011 Kirksey
2014/0074861 A1* 3/2014 Bieschke ......... H04N 21/44224 707/748
2019/0124390 A1 4/2019 Akselrod et al.
2019/0349413 A1 11/2019 Trammell
2021/0370138 A1* 12/2021 Iqbal ....................... G10H 1/36

FOREIGN PATENT DOCUMENTS

WO 2016/122985 A1 8/2016

OTHER PUBLICATIONS

International Search Report and Written Opinion mailed Feb. 8, 2022 in International Patent Application No. PCT/US2021/051557.

* cited by examiner

*Primary Examiner* — Jianchun Qin
(74) *Attorney, Agent, or Firm* — Wood, Phillips, Katz, Clark, & Mortimer

(57) ABSTRACT

A system and method for providing the coordinated playback of a video and audio stream by referencing timing information of the video and starting points of audio playback in relation to the video. The system and method allow users to access music and video from multiple right holders and play the music and video in a coordinated manner without having to negotiate a sync license from a rights holder.

17 Claims, 8 Drawing Sheets

| Real Time (Epoch Time in Milliseconds) | Video Content Time (In Seconds) | Playlist Time (In Seconds) | Song Time (In Seconds) |
|---|---|---|---|
| 1592932589097 | | | |
| 1592932590097 | | | |
| 1592932591097 | | | |
| 1592932592097 | | | |
| 1592932593097 | 0:00 | | |
| 1592932594097 | 0:01 | | |
| 1592932595097 | 0:02 | | |
| 1592932596097 | 0:03 | 0:00 | |
| 1592932597097 | 0:04 | 0:01 | |
| 1592932598097 | 0:05 | 0:02 | |
| 1592932599097 | 0:06 | 0:03 | |
| 1592932600097 | 0:07 | 0:04 | 0:00 |
| 1592932601097 | 0:08 | 0:05 | 0:01 |
| 1592932602097 | 0:09 | 0:06 | 0:02 |
| 1592932603097 | 0:10 | 0:07 | 0:03 |
| 1592932604097 | 0:11 | 0:08 | 0:04 |
| 1592932605097 | 0:12 | 0:09 | |
| 1592932606097 | 0:13 | 0:10 | 0:00 |
| 1592932607097 | 0:14 | 0:11 | 0:01 |
| 1592932608097 | 0:15 | 0:12 | 0:02 |
| 1592932609097 | 0:16 | 0:13 | 0:03 |

Diagram 1:

Diagram 2:

SYSTEM AND METHOD FOR SYNCING MUSIC

BACKGROUND OF THE INVENTION

Field of the Invention

Disclosed herein is a system and method for incorporating music into a video service utilizing a pre-existing license for the music, allowing content providers and customers to listen to the same music at the same time while viewing the same video content.

Background Art

In general, there are two types of music licenses that affect video content providers. The Public Performance License, and the "Sync License". The Public Performance License process has been made accessible and affordable to a wide range of companies and budgets. The "Sync" license has not.

The Sync license is currently the only way to legally compensate the music industry for recorded music accompanying video content. The advent of Live Streaming and Video on Demand services has spawned hundreds of new content companies and tens of thousands of new videos, most of which require music. To secure a Sync license, each use of as song must be licensed individually with all parties who have rights in the song. Obtaining a Sync license requires a sophisticated set of relationships, negotiations, number of involved entities, and pricing negotiations. The process must be performed directly with representatives of the rights holders—no automated process exists. Additionally, each song must be licensed for each video, and one license for one video does not protect the content provider for using that same song in another video. For these new content companies the rate at which content is produced is much faster than film or TV shows. A dozen or more videos may be made in a single week, each using many songs. A very active company may need to license over 20 songs per week, every week. In short, there is no feasible way for a company to successfully adhere to Sync license laws.

One prominent company (Peloton Interactive Inc) with access to a lot of money, staff, and relationships within the music industry claims to have attempted to adhere to Sync license requirements and reportedly spent tens of millions of dollars doing so, but still faced a lawsuit claiming hundreds of millions of dollars for failing to get it right. This creates a huge barrier to content providers who are otherwise eager to see the music industry compensated and customers to have access to the music they want.

SUMMARY OF THE INVENTION

The invention disclosed herein establishes a system and process for leveraging already-approved music licensing models/services to provide the option for music to accompany video content, in coordination with others, and without triggering the Sync license requirement. It is a departure from companies paying music providers to embed music within their content for presentation to their users. Instead, the video stream stays separate from the music track. The method enables content providers and customers to listen to the same music at the same time relative to the video content through their own subscriptions to music services. This is achieved by coordinating playlists within and/or across Music Streaming Services. This is an opt-in process that ensures both parties choose and pay for music. The Music Streaming Services may be the same service, or the users may be accessing their own accounts on different services. In some embodiments, the users may be accessing the same music account that allows for multiple users.

The invention disclosed herein is an improvement for all parties involved. The benefits can be grouped in four categories: process improvement, rights separation, access to better music, and music industry compensation.

Process improvement: The requirement of (and challenges created by) one-at-a-time negotiations for Sync licenses are eliminated and replaced with a well-defined and easy to use compensation mechanism for the music industry. The mechanism by which each party pays their part to the music industry is automatic through subscriptions to services like Spotify, Apple Music, and Amazon Music. This aspect alone resolves the major shortcoming of the current options: the process bottleneck of one-at-a-time negotiations across multiple parties.

Rights separation between the video content and the music prevents muddled ownership and access. When Peloton Interactive Inc was sued by the music industry many of their videos had to be pulled from the library due to contested song rights. The music and the video were intertwined. Had the music been separated from the video and audio, as it is with this method and system, then the content provider (Peloton Interactive Inc) would not have lost the substantial value of its video library.

Access to better music for content providers and customers: Content providers have access to music for themselves and can share their suggestion to their consumers. Consumers have the option to choose their own music, whether that is a playlist they created or listening to the suggested playlist in coordination with the content provider. This means that, for both parties, the quality of music is significantly enhanced compared to royalty-free music.

Additionally, with this method the music industry gets better compensated for their music than what has been the case under the existing challenges of Sync license negotiations.

Presently, there is no available alternative available for the Sync License process if a content provider wants first rate music. The most used legal alternative is to use "Royalty Free" music. This is a library of music sold for a flat rate, specifically targeting small content providers. The music is largely boring and unappealing. Although taste can be difficult to quantify, the lack of appeal for this category of music can be seen through the fact that companies would rather risk litigation by the music industry than use Royalty Free music in their services. In general, the Royalty Free category of music is less well compensated, attracting lower levels of talent. The music tracks have repetitive beats, few chord changes (which are the musical analog to an emotional progression) and very flat dynamic range. The few Royalty Free music songs that have emotional appeal are not nearly enough to satiate the appetite of a content company of aforementioned volume.

The system and process disclosed herein creates an opportunity for end users to have the music they want, played in conjunction with the video the services that they depend upon, and in a way that is feasible for content providers and rewarding to the music industry.

This invention establishes many new improvements including, but not limited to, the following:

- a means for incorporating music into a video service without triggering the "Sync" license requirement;
- a means for capturing the timing of an instructor's movement in coordination with music and replicating that relationship for a remote Participant without having the music intertwined directly into the video;

a means for bridging otherwise-isolated video and music streaming services into a coordinated whole; and a means for coordinated playback between music streaming services.

The essential components that constitute the invention are the fact that the music and video are separate, that there are separate rights ownership between the music and video stream, and that a 3rd party system can coordinate these elements to combine for a single experience for the end user in a seamless and predetermined manner.

DETAILED DESCRIPTION OF THE PREFERRED EMBODIMENT

Figure 1:
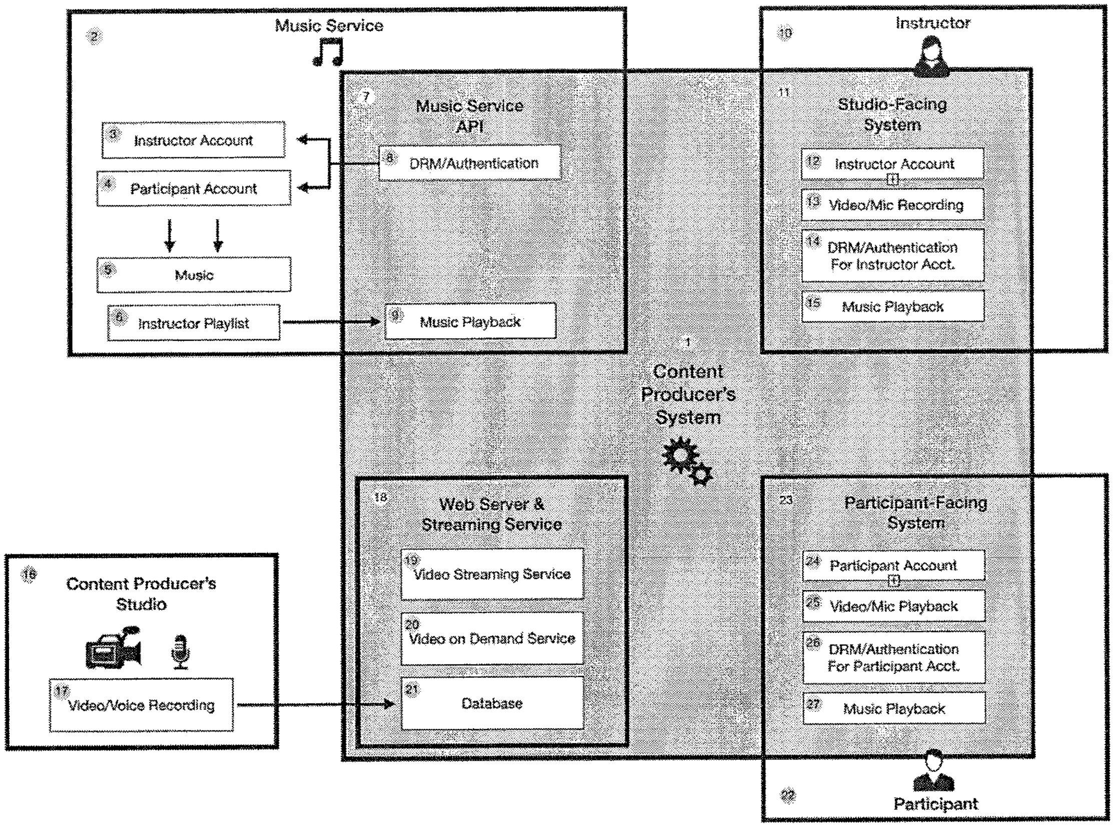
FIG. 1 is a graphic representation of the main components of the system of the invention and the relationship between components of the system.

With reference to the Figures, the components of the system and process can be described as set out herein. However, one skilled in the art will recognize that other components may be arranged and placed in communication with each other to achieve the ends of coordinating the video stream being played and the audio selected by the instructor. One skilled in the art will also recognize that the system and method described herein may be used for any type of audio file, or more broadly, the coordination of any files that may be desired to play or stream together. The components in some embodiments may be:

The Content Producer's System 1 to is central to implement this method as it brings together and coordinates all other components.

A Music Service 2, such as Apple Music or Spotify or another source for audio files.

Within the Music Service 2, an account for the Instructor 3 or first user.

Within the Music Service 2, an account for the Participant 4 or second user.

Within the Music Service 2 a repository of Music (songs) 5.

Within the Music Service 2, a playlist 6 made of up songs created by the Instructor 3.

Within the Music Service 2, an API 7 (Application Program Interface) or method to interact with the music service systematically.

Within the API 7 of Music Service 2, DRM/Authentication 8, or a way to establish authentication for the specific user who is accessing the system.

Within the API 7 of Music Service 2 an outbound music stream 9.

An Instructor 10. In some embodiments the Instructor 10 is optional and assumes this video content is led by an instructor. The role could be filled be a person off-camera as well.

A Studio-Facing System 11 used by the Instructor 10 or other role at the studio to coordinate interactions between instructor 10, music at the studio, and video created at the studio. In other embodiments, the video may already exist and is coordinated with music at the studio.

Instructor Account 12 within the Studio-Facing System 11.

For the Instructor 10 within the Studio-Facing System 11, a DRM/Authentication 13, or other way to establish authentication for the specific user who is accessing the Music Service Music Playback 14 for the Instructor 10 to listen to, setting the relationship between video and music.

Content Producer's Studio 15 where the video content is produced.

Video and Voice Recording 16.

Web Server & Streaming Service 17.

Live Video Streaming 18.

Video on Demand 19.

Database 20.

Participant 21 or second user of the system.

Participant-Facing System 22 to deliver video content and coordinate music playback.

Participant's Account 23 within the Participant-Facing System 22.

Video/Mic Playback 24 accessed from the Web Server 17.

For the Participant 21, a DRM/Authentication 25 within the API 7 of Music Service 2, a way to establish authentication for the specific user or Participant 21. One skilled in the art will recognize this may be the same or different API or music service of the Instructor 10.

Music Playback 26 for the Participant 21 to listen to, following the relationship between video and music set by the Instructor 10.

Real Time 27, in some embodiments measured as Unix Time or Epoch Time

Video Content Time 28

Playlist Time 29

Song Time 30 for a first song. In some embodiments the system assumes it is only 4 seconds long for demonstration purposes.

Song Time for a second song 31

One skilled in the art will recognize that the components, processes, and people described herein may be interpreted broadly. For example a Media Producer in this example represents the various roles involved in creating a piece of media to be consumed by an end user. In practice it may be a role that spans several people; but for clarity here it is expressed as a single person. The various roles could include on-camera talent, camera operators, video editors, sound editors, or post-production managers. Similarly, in other embodiments this role could be called a Content Producer, and the talent could take the form of specific types of role such as an instructor or trainer for fitness classes. In all cases it is a group or person who ultimately is responsible for getting the music and video to come together as the user will later experience it.

The Webserver 17 & Database 20 may be systems created by the company implementing this invention. It could also be described as the Content Producer's System insofar as the webserver and database work together to distribute all of the software including the edge devices like the ones used by the End User, trainer, and Media Producer. The system can be distributed across the Internet and multiple devices or it also be done locally and using non-Internet means of communication. It could even be done on a single computing device, but in all cases processing power and data storage are needed to coordinate the steps of the invention. This is the source that contains all necessary metadata, and the appropriate sequence of directives to enable the invention to work.

A Video Host, or Video on Demand Service, is a service optimized for streaming videos to end user devices. This is location for the video file itself, not the metadata. This role may also be fulfilled by the Content Producers Webserver (as a file) or database (as raw data) although this is typically not done for performance reasons. In all cases it is the repository for the video file itself. 19.

Video, as used here, may be a general term and means the entire video experience for the user. Sometimes referred to generally as "content, it is often used broader that the video data itself, and is better explained as the experience of the coordinated visual and audio event as experienced by the user. When video is used to indicate the video file itself it is worth noting that that video file typically also has an embedded audio track.

Playlist as defined here could be a single song, a formal playlist (as defined by the streaming service), multiple playlists, or a combination thereof. The playlist may be referred to as music.

A synchronization license is an agreement between a music user and the owner of a copyrighted composition (song), that grants permission to release the song in a video format (YouTube, DVDs, Blue-ray discs). This permission is also called synchronization rights, synch rights, a sync license, and sync rights.

Meta data is data about other data. Whereas a video may be data, the video's metadata is the information about the video.

Regarding the computing devices and communication protocols used, in the diagram herein, each user utilizes a different computing system for their respective facing systems. Although all of these comprise one larger system, the reason for this distributed computing and device setup is for user convenience. Many variations may be used:

In some embodiments the on-camera talent such as the Instructor 10 uses a tablet running an app connecting to a Webserver 17 and Database 20 running the system designed to facilitate this invention. The tasks performed by this device are to setup, start, and end the class/video; and to begin music playback 14. Each of these activities signals a change to the Webserver 17 & Database 20 in the form of metadata to assist with coordinating activity across all users in a controlled sequence.

In some embodiments the studio control desk operator uses two PCs as part of the Content Producer's System.

The first computer runs a web-based application (webapp) connected to the same Webserver 17 and Database 20 as the on-camera talent. The tasks for this component of the larger system is to create the class/video, and to actually play the music for the on-camera talent. This PC is connected via audio output to a FM transmitter that broadcasts the music to the talent's headphones. The music is not broadcast from the talent's tablet because that would require using Bluetooth which has latency (delay).

The second PC is a streaming computer running the software that brings in the camera and microphone input signals and streams them out to the Video Host, in this case Amazon Web Services which a common platform for video streaming.

End Users or participant 21 are given many options on how to view the classes. They are able to use a web browser, an iOS or Android app for their phone or tablet, a FireTV app for big screen TVs, or an embedded screen on certain models of the equipment itself. In all cases these devices have in common:

The ability to connect to the Webserver and Database.

The ability to run the software designed to facilitate the invention.

Necessary video players to show the video stream.

Necessary security features that enable the interaction with Music Streaming service's API 7 (Application Program Interfaces) and authenticate and receive the desired music.

The system designed to implement this invention is not restricted to any particular kind of computing platform, database or communication protocol. Going to an extreme, it is feasible to design the entire system into a single computing device. The computing and communication ecosystem chosen is the one that best addresses the difference in physical space (and perhaps time) between the content creator and viewer. Users who are far away from the studio require systems that can distribute the technology to their location. Users who participate at home require consumer-level devices for greater convenience in price and form factor. The communication protocol and technology backbone chosen to deliver all of this will depend on the best available technology at the time.

Figure 2:
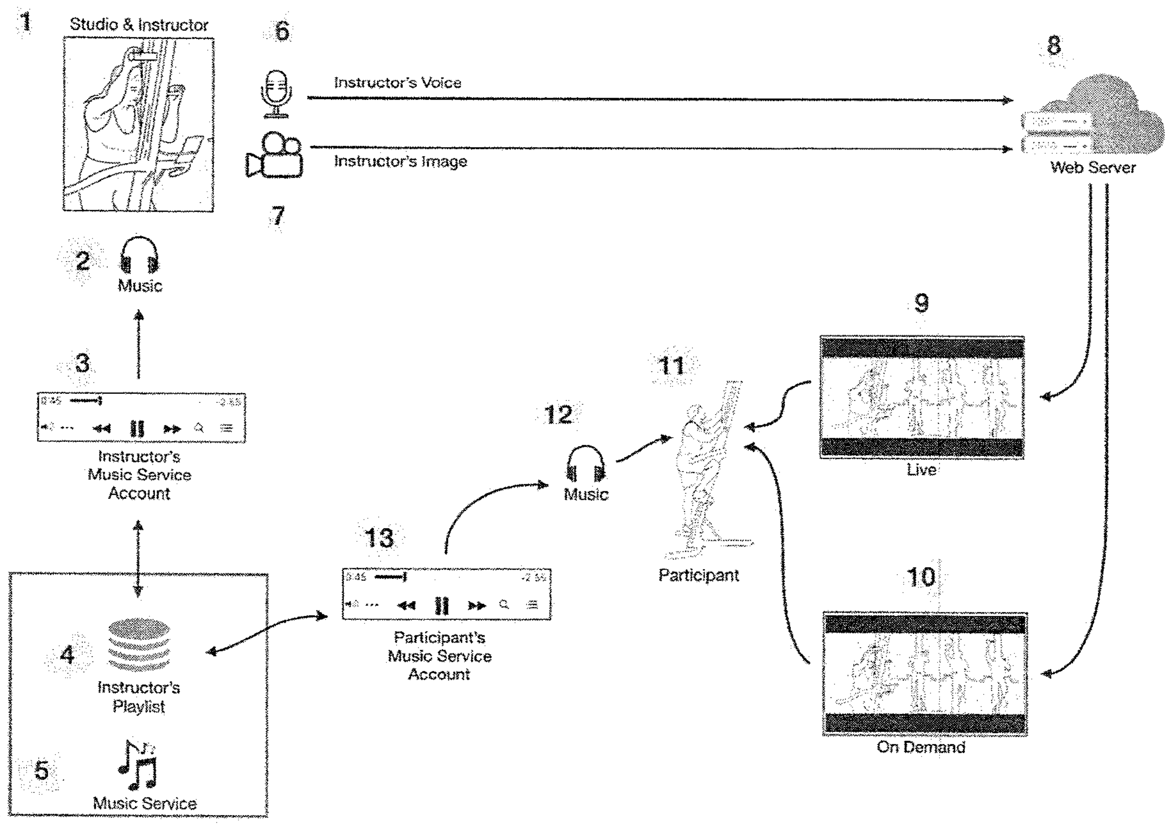
FIG. 2 is a graphic representation of the flow of activity between the components of the system.
Figures 3, 4:
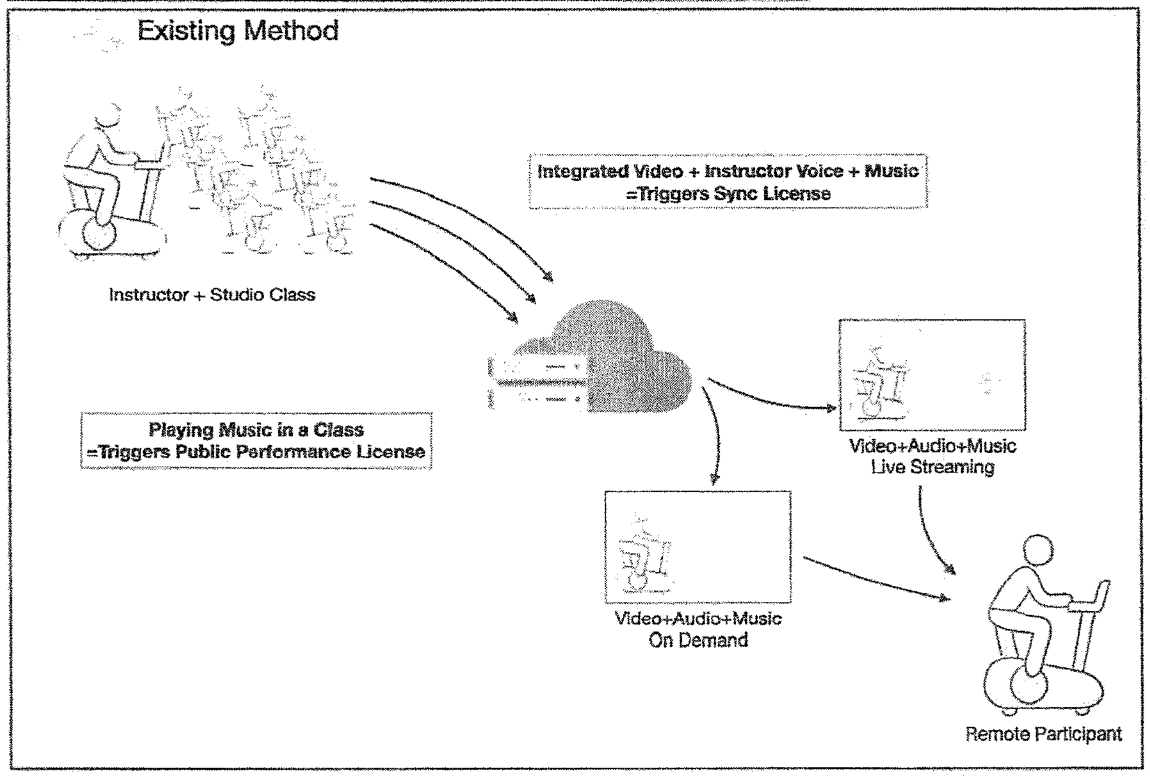
FIG. 3 depicts an example of the relationship of time across multiple entities.
FIG. 4 is a graphic representation of a system of the prior art providing a synced audio and video stream.

As graphically set out in FIGS. 1 and 2 the Content Producer's System 1 bridges the Studio 15, Instructor 10, Participant 22, Web Server and Streaming Service 17 and Music Service 2. It also keeps track and coordinates time, including Real Time 27, Video Content Time, 28, Playlist Time 29, Song time 30, and Song time for a second song 31.

In sequence, an Instructor 10 at a Studio 15 leads an activity such as an athletic activity like a workout on an exercise machine while listening to Music 9 through their personal Account 3 from a public Playlist 6 on a Music Streaming Service 2 to which they are a member. The Instructor's Image and Instructor's Voice are transmitted as Video 16 to the Web Server 17. The Studio-Facing System 11 tracks when the Instructor 10 begins playing the Music 14 relative to the Video 16, although no Music 9 is present on the Video 16 itself. A Participant 21 requests either a Live Stream 18 or, at a later time, a Video on Demand 19 of that Video 16 from the Web Server 17. The Participant-Facing System 22 provides the Participant 21 an option to listen to the same Playlist 6 at the same time relative to what the Instructor 10 did. This Music 9 is provided by a public Playlist 6 and accessed through the Participant's Account 4 through the Music Streaming Service 2, or another streaming service that has the particular piece of music and for which the Participant 21 has an account. The Participant-Facing System 22 coordinates both the start of Music playback 9 and also monitors the Music 9 and Video 16 to be sure they stay coordinated throughout the duration of playback.

The Times 27-31 are coordinated as follows: The System 1 references Real Time 27 when the Video 16 begins. Subsequently, the Instructor 10 begins Music Playback 9 and the system tracks that intersection of Real Time 27, Video Content Time 28, and Playlist Time 29. As the first song begins, the Song Time's 30 intersection with Real Time 27 is captured. This begins anew after the song finished, the inter-song break completes, and the next song begins or song time for second song 31 begins.

In the case of a live class, the system and process may proceed as follows:

1. The Instructor 10 or Studio 15 begins a video stream, which is transmitted to the Participant's machine or Participant facing system 22 through a Web Server 17. The video is not presented right away, rather the application hides this from the Participant 21 and presents a welcome screen instead. This step is not required for the invention but adds additional steps to the method required to achieve the desired result.
2. The Instructor 10 or Studio hits "Start" which tells the application to begin streaming the video to the Participant's machine. In some embodiments it waits until the next whole round second to do so to make timing easier. In some embodiments any increment of time may be used.
3. When the instructor 10 is ready for music to begin, they issue the command to the system to begin music playback and the system provides that command to the streaming service. The "Real Time" in UTC is recorded in milliseconds, and the Instructor 10 now hears their music playing through their music streaming account or music service 2.
4. System configuration step: A "keyframe interval" (chunk or packet or increment of data) is set to an exact duration, for example 3 seconds.
5. Each chunk of video data passing from the computer at the Studio into the Web Server 17, and subsequently to the Participant's machine, is encoded with the UTC ("Real Time") timestamp for when that data was uploaded to the web server 17.
6. The Participant's machine or Participant facing system 22 gets the time for when the music should begin to play from the web server 17.
7. The Participant's machine communicated with the web server 17 and monitors the timestamp from the video chunks as they are played. When the timestamp on the current chunk of video to the time that music should begin is less than the keyframe interval, then the system does the math on the difference and begins music playback on the Participant's machine. One skilled in the art will recognize that the timing calculations can be performed by either the Web Server 17 or by the participant facing system 22.
8. The system issues a play command to the Participant's Music Streaming Service 2, and the Participant 21 hears the same music as the instructor 10 at the same relative time to the video that the instructor 10 heard it, thus achieving coordinated playback with the Studio/Instructor's movements.
9. The system may now monitor the playback of video and music to ensure they do not drift from one another.
10. The system must query the Music Streaming Services and construct "Playlist Time" by adding the seconds for each song and include the forced (and equal) silent break between each song.
11. The system, at each Participant's machine, continually (or periodically) evaluates the intersection between Video Time 28 and Playlist Time 29 to ensure they match. If drift occurs then a correction must be made to bring the music back in line with the time on the video such that the Participant 21 hears the same music as the instructor at the same time.

In the case of utilizing video on demand rather than a live class, the process and system may be altered as described below:

1. No keyframe interval is used. The system buffers the whole video (or a lot) right from the start. The System periodically evaluates how many seconds into the video vs. how many seconds into the playlist and looks for any discrepancy indicating that they have become out of alignment. Achieving sub-second fidelity: The library that plays video has an event called "time update", does this to milliseconds. The playlist is same as it is during live streaming. In determining where a playlist is in time, Apple reports whole seconds, Spotify does milliseconds; but if the system scrubs (move forward or backward to a specified location) then the system can specify milliseconds on both.
2. How the System decides where to start the music: Math of Time that this video is recorded at "X" UTC and played music at "Y" UTC and so that equals "Z" milliseconds. Start music at "Z" milliseconds into the video.

One skilled in the art is able to create this system based on the overall architecture communicated above and the considerations described herein.

Figure 5A:
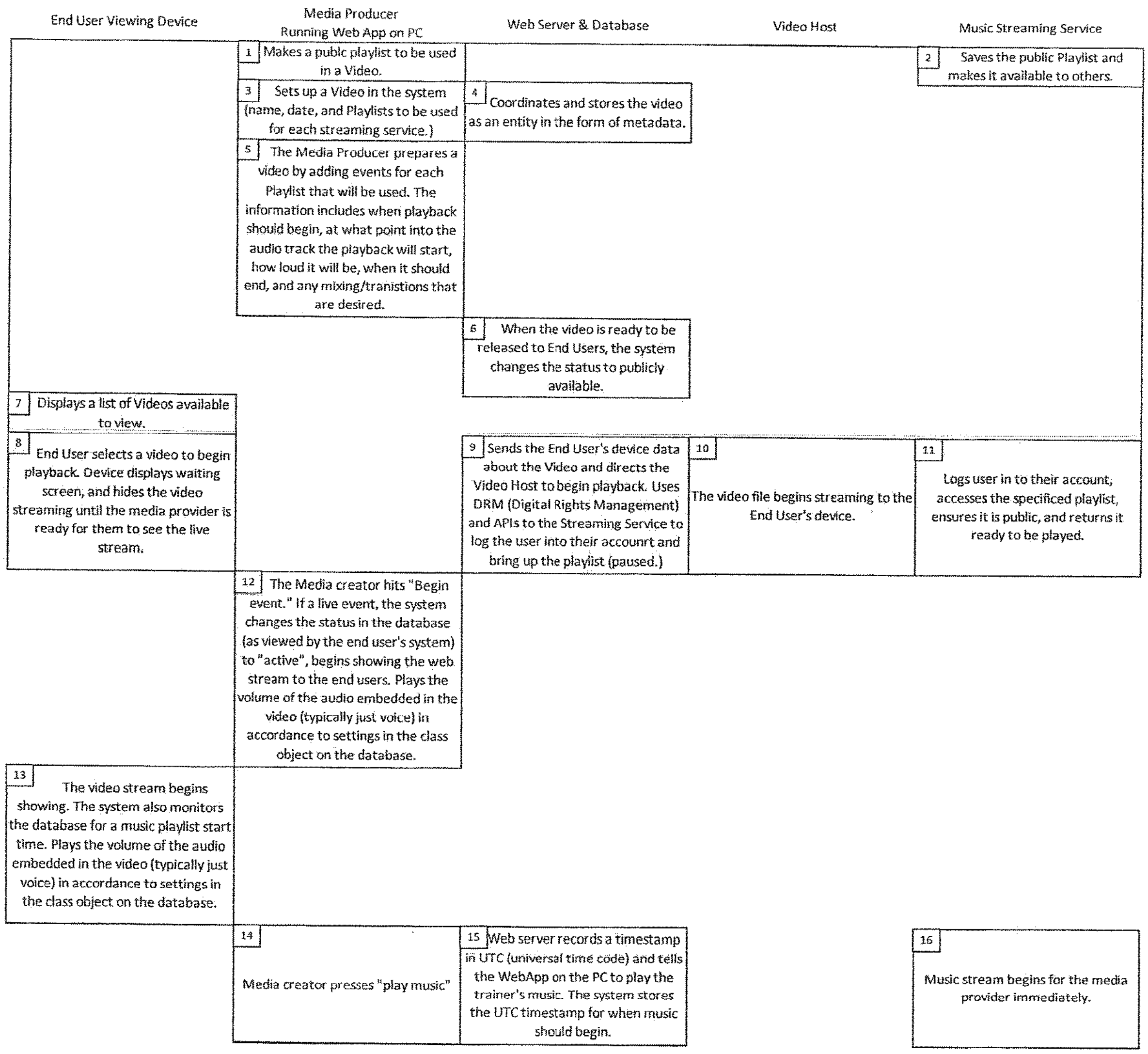
FIG. 5A is a partial chart showing the steps performed in one embodiment of the system
Figure 5B:
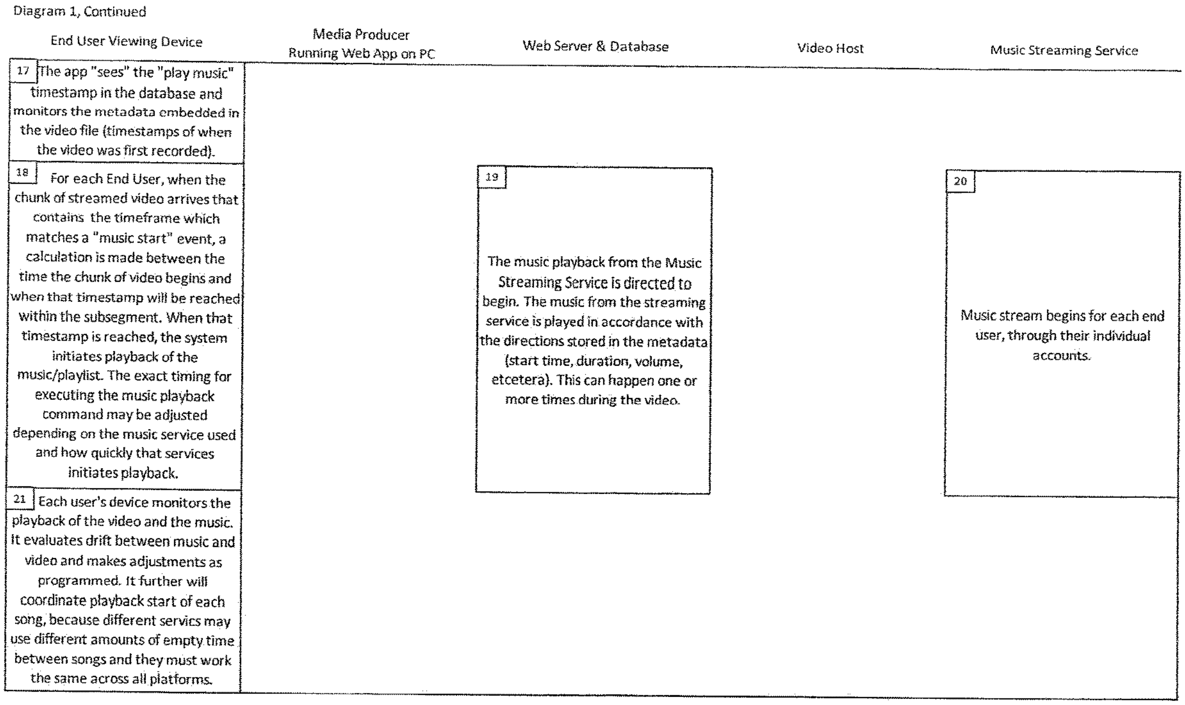
FIG. 5B is a continuation of the chart of FIG. 5A.
Figure 6:
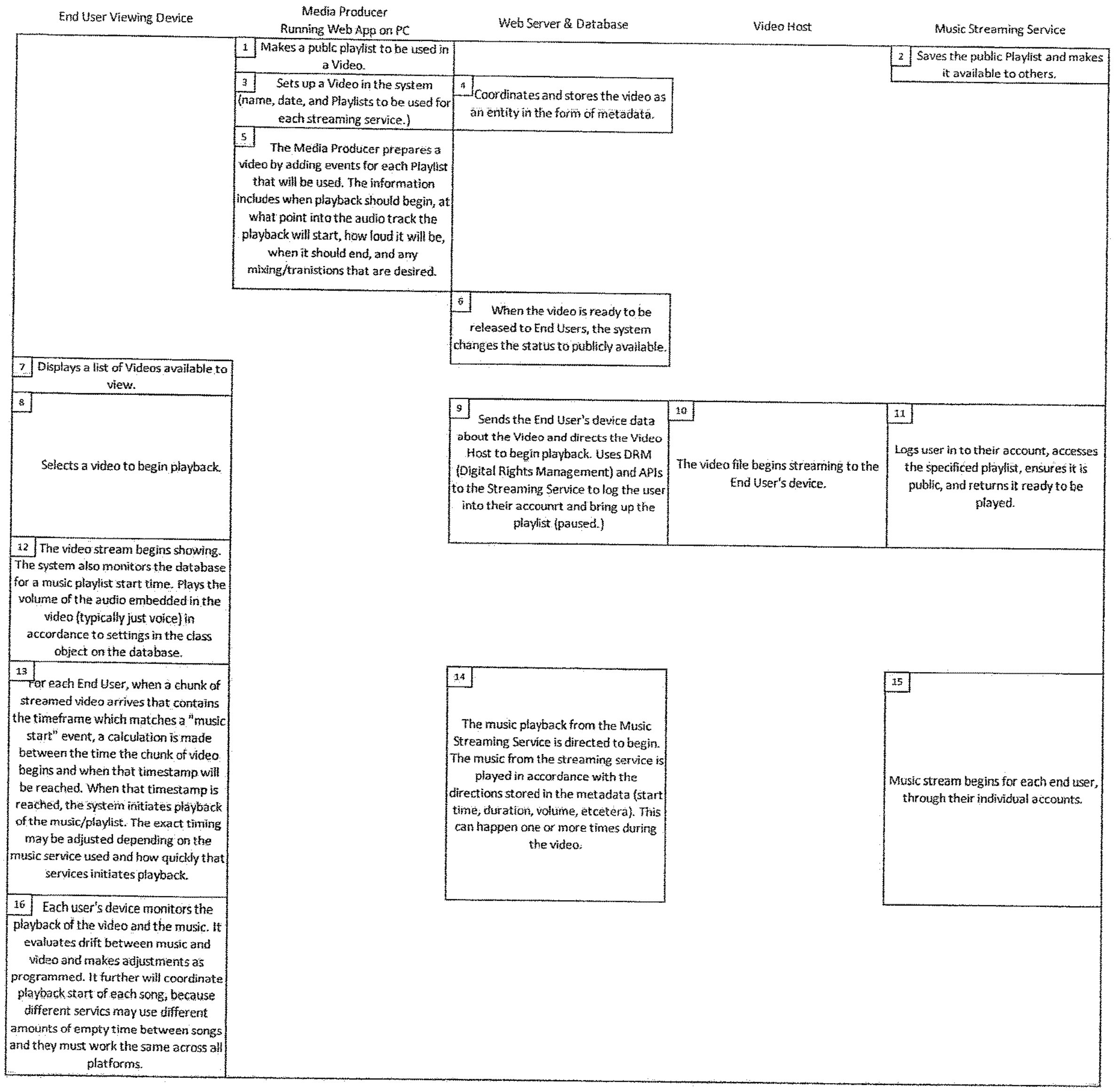
FIG. 6 is a chart showing the steps performed in another embodiment of the system.

FIGS. 5A, 5B and 6 are flow diagrams setting for the general flow of the steps in the system in some embodiments. FIGS. 5A and 5B address the example of the music getting added to content in real time, meaning the on-camera talent or instructor 10 is doing something that involves music and the music is queued and played to that talent during recording just as it will be played to the End User or participant 21. The video itself may be streamed live and/or be added to an On-Demand category of prerecorded content later. This scenario is common in streaming fitness classes where the end user or participants 21 are joining in as the event happens.

Before the class can be broadcast, some setup is required. Let us take the example of a streamed fitness class. This is not a typical class insofar as the video stream and music stream will be coming from separate entities and separate rights-holders. This means that the metadata plays an active role in coordinating and assembling the full experience for the End User. This setup begins with step 1, where a Media Producer makes a public playlist using a Music Streaming service such as Apple Music or Spotify. Here they are identifying the songs and sequence that they want the end users or participant 21 to experience during the class.

In step 2 we see that the Playlist is stored by the Music Streaming Service. (Note: At no time is the music in physical possession of the Media Creator nor End User or participant 21, rather the music is played temporarily to the Media Creator and likewise to the End User or participant 21 each through a DRM-authenticated music player while accessing the music as authorized via their own account.) The Media Producer must also set up a data entity in the system that represents the class to come. This is step 3. They are not setting up the class itself, but instead are setting up data about the class. This includes its name, date, description, and playlists to be used. It may also contain detailed instructions for combining the music with the video including volume, whether or not the song should start from the beginning, and when it should end. Advanced mixing and transition instructions could be added to more seamlessly integrate the playback of music into the video production.

Once the video is set up and ready to be announced to End Users the Media Producer makes a change to the metadata of the video enabling it to become publicly viewed. (Step 6.)

Which allows the class to be shown on the End User's display device, step 7. The End User or participant 21 can then select the class, step 8, and this will kick off the events that present the larger Video experience to the End User or participant 21. Their screen will change to present the container for the video, but since this video is not-yet-streaming it is covered by a welcome screen so-as to provide a more visually-friendly experience. The Webserver 17 sends the End User's device or participant facing system 22 all of the necessary information for the class (step 9), including the credentials needed to log the user into their Music Streaming account 2 (which, after the user provides initial permission, is done in the background via APIs). The Video Host, such as Amazon Web Services or other service provider that specializes in storing and streaming video content then begins the video stream (step 10). The Music Streaming Service 2 is contacted and the user is logged in, authenticated through the stored credentials using the provided protocol, such as DRM 25 (Digital Rights Management, a system designed to prevent piracy) and the desired music is queried (step 11). This is an allowed, but not intended, purpose for the API 7. The anticipated use case for the API 7 is to embed the Music Streaming players into other software platforms, much like how Waze (the car navigation app) allows a user to listen to Spotify music while looking at their navigation screen. It is not designed to coordinate music with video.

When the Media Creator selects the button to begin the Video (step 12) then the video is shown to, and begins playing for, the End User or participant 21 (Step 13). The End User's device or participant facing system 22 is given all information necessary to start monitoring when the music should begin playback (step 13) relative to the video. But it is not until the Media Creator presses "play music" in step 14 that the system knows when to initiate playback for the End User. When this steps happens a timestamp is saved in the form of Universal Time Code (UTC) as denoted in step 15. Subsequently, the Music Streaming service 2 begins streaming the music to the trainer or instructor 10 teaching the fitness class, step 16. In step 17 the End User's or participant facing system 22 detects the playback timestamp from step 15 and begins monitoring for that event in the video stream which typically lags the instructor 10 by 15-30 seconds. The detection of the targeted timestamp will vary in time from user to user. As we see in step 18, when the time stamp arrives within the boundaries of a chunk of video that was just buffered into the End User's system, the system makes a calculation to identify at what time within the video chunk the music should begin playback and schedules that event. The music playback for each user or participant 21 is independently directed to begin in step 19 and the Streaming Service begins delivering the music in step 20.

Achieving the correct timing requires a method that bridges the two sources. This could be as rudimentary as counting the number of seconds into the video stream that the playlist should begin and starting the playback accordingly, however the human ear is very sensitive to timing. Moreover, the human brain is very good at matching audio events to visual events. To get sub-second precision a more sophisticated method is required. Delay from when a command is sent to begin video file streaming compared to when the video actually begins playing can vary from a few milliseconds to a few seconds. This is also true with audio streaming. Further, both are susceptible to delays or hiccups in playback due to bandwidth limitations. For this reason it has been found that the best method for playback is to establish a time format that can be compared between the video and audio stream. In short, we need an absolute value to reference rather than a relative value. This can be found in the fact that video streams encode UTC (Universal Time Code) into every "chunk" of video that is transmitted to the server. Further, this metadata is available to be extracted, although not for this purpose. Since we recorded the UTC timestamp for when the Media Creator began the music in step 14 we have a like-for-like measure of when playback should begin. It is this information that is used on step 13 to evaluate when to initiate playback. Furthermore, it is derivatives of these timestamps in conjunction with video and playlist durations that are used to monitor and correct for music-video drift as described in step 21.

The above steps could be reorganized. For example, the video could start streaming (step 9) immediately after the user or participant 21 requests it (step 7) or even without a user selecting it at all. The detail is provided to give one skilled in the art the capability to replicate the invention. The essential components that constitute the invention are the fact that the music and video are separate, that there are separate rights ownership between the music and video stream, and that a 3rd party system can coordinate these elements and combine them into a single experience for the end user in a seamless and predetermined manner.

FIG. 6 illustrates the flow in the example or embodiment where music or other audio is added to content during the editing process. This scenario is common in producing television shows where the end users are watching a prerecorded Video.

Video and film production often refer to the three phases of "pre-production" (the writing and prep work to initiate the project), "production" (when the content is filmed), and "post-production" (the editing, scoring, and preparation of the film to be released). Whereas the embodiment described in FIGS. 5A and 5B integrated this invention into the production phase, in the embodiment shown in FIG. 6, it will be added in post-production. We will use the example of a video editor preparing a television show.

With reference to FIG. 6, In step 1 the editor makes music Playlists to be used in the show and the Music Streaming Service saves that data in step 2. This could be in the form of one playlist 6 with multiple songs, multiple playlists with one song, or a combination thereof. The Editor creates the video data entity in the system in step 3. The music will be integrated differently in a television show than it is in a fitness class. Typically there are music queues in many places, often for partial songs, and seldom are the songs organized into a single back-to-back playlist. These elements, as recorded in the metadata, represent a more complex set of instructions than in FIGS. 5A and 5B. All of this is stored in the database 20 in step 4.

In step 5 the editing process of integrating music to video begins. For each desired music queue the editor adds the necessary metadata to control the music playback. For example, when dialog is present during a scene that is predominately music, the level of the music may be turned down so the dialog is more clear. This can be done with a fade or a cut. In either case this is represented at metadata within the class. Playback timing is also different. Whereas the example of fitness class in FIGS. 5A and 5B had a single playback event encoded in UTC, here there may be a dozen of more events. Given that UTC is not available in the same sense as it is during a streaming of a live event playback time is better suited. This does not hinder playback timing due to the fact that everything is decided and tested ahead of time versus recording and shared in real time. The video metadata can specify that a song start at a specific fraction of a second within the video and that playback can be tested to be sure of the desired result.

Once completed, the video editor releases the video to the end users or participant 21 in step 6 and those users see it as available in step 7. In step 8 the user begins playback and the system then sends the End User's device the necessary information for coordinated playback in step 9. The video begins streaming in step 10 and the Music Streaming Service is engaged and prepared in step 11. The video stream begins showing in step 12. Unlike the steps in FIGS. 5A and 5B, the timing of the music is already documented and received by the End User's or participant facing system 22 system from the very beginning of video playback. For each music playback event the End User's system triggers the playback in step 13. In step 14 the system passes on the commands to the streaming service and in step 15 it begins to play. Step 16 is the process where in it monitors the playback to be sure the rendering of volume and transition and timing are all correct.

Figure 7:
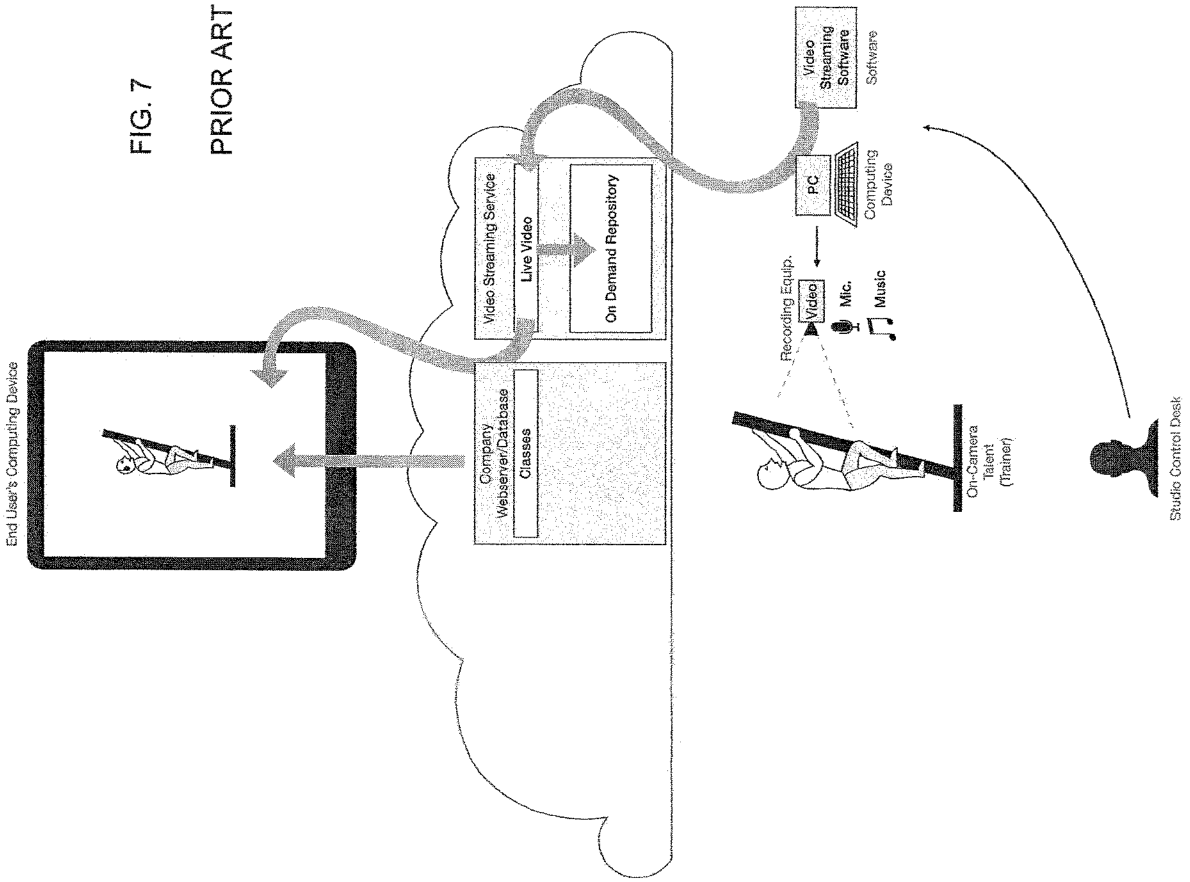
FIG. 7 PRIOR ART
FIG. 7 is a graphic representation of a system of the prior art for providing a synced audio and video stream.
Figure 8:
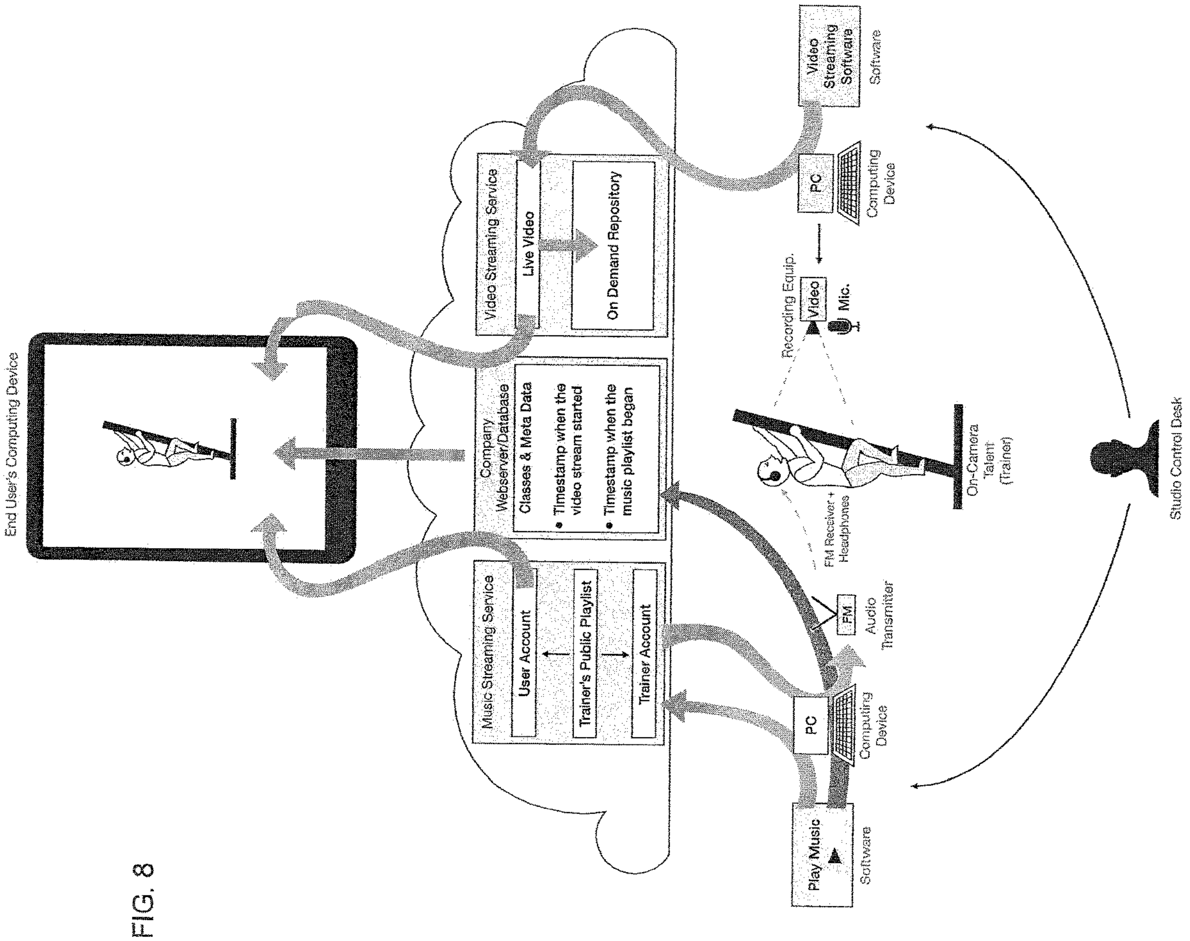
FIG. 8 is a graphic representation of a system for coordinating the audio and video streams by accessing user accounts on music services and playing the respective audio streams.

FIG. 8 shows a system in contrast to the prior art system shown in FIG. 7. As shown in FIG. 7, Although a company web server is Typically still present, it does not contain information on coordinating music playback through a end-user's personal music streaming account in coordination with video. The end user's software does not have means to play music through their personal account, not to coordinate it with music heard by the trainer. The music is played in the studio and synced (intertwined) with the video stream presenting Sync License issues.

As shown in FIG. 8, with some of the embodiments of the invention described herein, Studio Control Desk Operator begins streaming a class via Video Streaming Software. The video continually encodes a timestamp (in UTC) in the video stream. When the Trainer is ready for music to begin, the Studio Control Desk operator initiates music playback of the Trainer's public playlist within the streaming service. The system records the exact time (in UTC) that the music began. The timestamp may be saved in a database, located in a webserver, or at any other location or device that the user or participant's computer, equipment, or system has access to.

For coordinated playback, a User or participant selects a video, the System looks at video meta data for playback coordination instructions, the System authenticates the end user on their streaming service. The System begins playing video from streaming host & monitors UTC timestamp embedded in each chunk of streamed video. This timestamp shows exactly when it was first recorded. When UTC timestamp in video matches when the trainer had begun playback of music, the system triggers the streaming platform to begin playing the music to the end user through their own account.

In some embodiments, a number of common considerations exist, as discussed below.

Playing music at various locations at the same time is challenging on a number of fronts. This is especially so when multiple Music Streaming Services are used. A plurality of techniques have been developed to enable this to work. In some embodiments, these techniques may include:

Time Synchronization:

Video content, even live streams, do not progress in perfect unison for all individuals watching. Unlike radio broadcast, where a signal is sent and displayed in Real Time, videos are transmitted as data. Video data must buffer (preload a portion) to begin playback at remote locations. Buffering time varies from person to person depending on the quality of connection and bandwidth.

"Real Time" in the world

"Video Content Time" which starts at 0:00 and progresses upwards from there

"Playlist Time" which starts at 0:00 and counts up

"Song Time" which starts at 0:00 and counts up for each song in the playlist.

To coordinate everything the content provider must issue a command into the system when music should start on all devices. This means intersecting "Real Time" (when the play button is pressed) and translating that into a documented point in "Content Time" (where in time the video was when the play button was pressed) and "Playlist Time" (starts at 0:00) so that the right music is playing at the right time.

Further, song start must be coordinated for each time a song. begins.

Song Coordination:

Typically, in software system, a numeric or alpha numeric ID or "key" is used between systems to identify like data entities. When coordinating the same song across multiple music services there is no common key to identify the mapping of a song in one system to a song in another system. Names may or may not be the same. Thus, the system must map like items from one to another. This done by sequentially tracking the number (song) within an index (playlist).

Music services handle communicating playlists differently through Application Program Interfaces (APIs). Some will allow the entire playlist to be queried. Others will only give the current and next few songs. This makes it important to keep contextual awareness of all Participant's location within a playlist, especially when they are collectively using a multitude of streaming services.

For instance Apple Music seemed to have scrubbed forward because the Participant 21 would get ahead of the right spot and it couldn't scrub backward, and so it would hop to the next song. Spotify promises would return the promise when acknowledging the request, but still had to wait and monitor for request (like play next song) to actually be executed. One skilled in the art will recognize each music service may have its own unique issues for timing and coordination of the video and audio or music streams.

Beyond identifying what songs are being played (and will be played) it is further important to know where in time each Participant 21 is ("Playlist Time"). Streaming services do not provide total time of playlist, but only the duration and current position in each song. Thus, in some embodiments, the Playlist Time 29 has to be calculated and cannot be directly queried.

Staying in Time & Getting "Beat Accurate"

The human ear can easily identify when the beat is off. Music beats per minute (BPM) are often over 100 and up to 180 BPM. But playlists are set by the whole second. And thus we must synchronize the audio across multiple devices at an accuracy of ½ to ⅓rd of a second.

The empty time between songs varies from one music service to another. The timing for song start in each service must be coordinated in a way that allows each services to start in-time with one another. This can be done by delaying the song start for a service that has less pause between songs, or by skipping to the next song on a slower service to bypass the delay.

For instance Apple music service won't start buffering the next song until the current song ends, causing a delay of 1300-2000 ms between songs; whereas Spotify music service starts buffering next song before the current song finishes and typically has only a 30 ms gap between tracks.

Drift can happen between the Video Time and the Playlist Time and must be corrected periodically. This drift is caused by video and music playing separately and delays or lags in either service. Therefore, even if playback starts at the same time across all Participants the timing could still require correction. The coordination of music playback must be constantly monitored and periodically corrected.

Correcting music timing during playback can be disruptive to the music experience and thus needs to be minimized. The system checks and corrects if the variance is greater than the specified threshold (for example, 1000 ms for 5 consecutive keyframe intervals) and makes a correction. Another embodiment of this invention would use waveform and beat analysis to identify places in the music that presents less noticeable disruption to the Participant. A third, and more simple, embodiment could direct correction to take place between each song to eliminate or minimize mid-song correction.

Triggering systematic changes in music playback (modifying the timing of the playback as it plays) requires issuing commands to streaming services. These commands have undetermined latency (pauses) between when the command is given and when the music actually begins to play, making it more difficult to get timing accuracy.

This especially happens when a Participant 21 joins late, and so the system uses timers to check how long it takes for that Participant 21, and apply that into playback calculations.

Sometimes the above is not true. If the data is already buffered, it can do it without going to the web server 17 at all.

Authentication for Music Streaming Takes the Form of DRM.

Device Rights Management ("DRM") is the process by which Music Streaming Services ensure that music is being played within the legal constraints of its licensing process.

The Participant-Facing System 22 may have a browser to allow DRM-integration. The browser is a tool for the music streaming service whereby they collect a number of browser-accessible IDs and system-level observations about the user's device and software to create a "fingerprint". This fingerprint, so to speak, is an encrypted key used to ensure that the music is being delivered to the same device as the one that was authenticated.

There are many constraints imposed on a developer by music services that affect the system's ability to login and access the music via an API. This can vary depending on the music service being used. One skilled in the art will be able to adhere to these requirements.

For example if System A encrypts & sends to System B and System B sends that same encryption to the music service 2, then that music service 2 will ascertain that the decrypted key for System doesn't match the current System B and it will block music from being delivered to System B.

If one uses a software framework that runs its own internal web server, then that web server will have a different fingerprint from the native browser on the same system. In this case the user will still be blocked from receiving music because, even though it is physically the same device, there is a system mismatch.

The DRM aspect of a Music Service's API is not in the test data. One skilled in the art must build and test this on a HTTPS connection to validate that their implementation of this method works.

The main elements to this method are a system (or systems that work together) to bind the various elements together, a video source, and a music service. The studio could take other forms. An instructor doesn't need to be present on the video stream, although someone producing the video will need to signal when music playback should begin. The Participant could take other forms, but would need to have the right legal access to play music.

So, for example, if the Participant 21 took the form of a group watching/listening, then they would need access to a music service that would allow that to take place, or some form of public license. This is not required technically, but may be utilized for legal reasons. If music services were to change their terms of service then new steps could be required. If the music service were to integrate this method directly into their systems then it would appear some steps (like authentication) would be bypassed, but they would still be taking place, just at a different step or phase with a system. A last observation is that it does not have to be a single system that unifies this process. The activities of the system as described could be separated and performed by various systems.

In some embodiments the system described herein may become device agnostic. The display video system for the Participant 21 could take several forms and be delivered through any number of devices. The key to which devices could be used relates to the access points provided by the music streaming services or providers. The method as described above uses a web browser embedded in the Participant-Facing System 22, which is critical to the DRM process described herein. Therefore, implementing this method on other devices would require access to the music services through a compatible browser. If the music providers develop or modify their processes to create other forms of authentication or by directly embedding their app within a device then this would enable a new set of devices to fulfill the role of presenting music to the Participant 21.

To use the method described herein a person or company would need to create a system, most likely with software, that would replicate the steps and requirements above. There may be variations in the details depending on what video service is used and what music streaming services are to be supported, but these modifications will be obvious for one skilled in the art of software design.

Whereas the example provided within this application is specific to a video service in the fitness industry, the method could be used in any interaction between video and music. It would not depend on whether live or on demand and could range across all forms of media distribution and broadcast. The specific embodiments described herein are but examples, and are not meant to limit the scope of the invention.

The foregoing disclosure of specific embodiments is intended to be illustrative of the broad concepts comprehended by the invention.

The invention claimed is:

1. A system for simultaneously playing an audio file with a video stream, the system including:

a studio facing system for accessing a first user's audio account on an audio service for storing and accessing audio files to be played by users and for initiating playback of a selected audio file to a first user's location, the first user and a second user having an account on the audio service, a web server for providing a video stream provided to the second user's location, the webserver including timing information identifying the video stream time when the audio file playback began at the first user's location, the timing information being received from the studio facing system as a timing signal, a participant facing system at the second user's location for accessing the second user's audio account on an audio service for storing and accessing audio files to be played by users, for accessing the web server to obtain the timing information, and for playing the video stream, the participant facing system monitoring the video stream timing information and initiating playback of the selected audio file at the second user's location, by the participant facing system using the second user's audio account to request playback from the audio service, so that the playback of the selected audio file begins at the same time relative to the video stream as playback of the selected audio file at the first user's location, wherein the web server does not initiate playback of the selected audio file at the second user's location.

2. The system of claim 1, wherein the first user and second user audio accounts are on the same audio service.

3. The system of claim 1 wherein the first and second user audio accounts are on different audio services.

4. The system of claim 1 wherein the timing information is a meta data timestamp stored on the webserver, the timing information being embedded in the video stream, the participant facing system in communication with the webserver and monitoring the meta data embedded in the video stream provided to the participant facing system, detecting the meta data, and initiating playback of the selected audio file at the second user's location when the video stream reaches the video stream time when the audio file playback began at the first user's location.

5. The system of claim 1, wherein the web server communicates with the audio service to access an audio playlist created by the first user.

6. The system of claim 1, wherein the web server delays transmission of the video stream to the participant facing system.

7. The system of claim 1 wherein the first user is an instructor and the second user is a participant in an exercise class.

8. The system of claim 1 wherein the video stream does not include the audio file.

9. The system of claim 1 wherein the second user requests a live stream of the video stream.

10. The system of claim 1 wherein the system tracks real time and the video stream time.

11. The system of claim 1 wherein the studio facing system instructs the system to begin providing the video stream to the second user's location.

12. The system of claim 11 wherein the studio facing system provides video stream timing information to the participant facing system.

13. The system of claim 1, wherein the participant facing system monitors the video steam timing information, the video stream timing information including a time stamp, the participant facing system comparing the time stamp to a keyframe interval, and initiating music playback when a difference between a time the music should begin on a current frame of video and the time that the music should begin is less than a keyframe rate.

14. The system of claim 1, wherein the participant facing system is incorporated into an exercise machine.

15. The system of claim 1 wherein the system buffers the video, and after the playback of the selected audio file begins at the second user's location, the system compares the video stream timing information and audio file timing and determines if the video stream and audio file are out of alignment.

16. The system of claim 1 wherein the video stream includes exercise instruction, and the participant facing system is at least partially located on an exercise machine.

17. A system for simultaneously playing an audio file with a video stream, the system including:

a studio facing system for accessing a first user's audio account on an audio service for storing and accessing audio files to be played by users and for initiating playback of a selected audio file to a first user's location, the first user and a second user having an account on the audio service;

a web server for providing a video stream provided to the second user's location, the webserver including timing information identifying the video stream time when the audio file playback began at the first user's location;

a participant facing system at the second user's location for accessing the second user's audio account on an audio service for storing and accessing audio files to be played by users, for accessing the web server to obtain the timing information, and for playing the video stream, the participant facing system monitoring the video stream timing information and initiating playback of the selected audio file at the second user's location so that the playback of the selected audio file begins at the same time relative to the video stream as playback of the selected audio file at the first user's location, wherein the timing information is a metadata timestamp of the UTC time when the video file was first recorded, the metadata timestamp stored on the webserver, the timing information being embedded in the video stream, the participant facing system in communication with the webserver and monitoring the metadata embedded in the video stream provided to the participant facing system, detecting the metadata, and initiating playback of the selected audio file at the second user's location when the video stream reaches the video stream time when the audio file playback began at the first user's location.

* * * * *